United States Patent
Egedal et al.

(10) Patent No.: US 8,561,397 B2
(45) Date of Patent: Oct. 22, 2013

(54) LEAKAGE DETECTION SYSTEM IN A WIND TURBINE

(75) Inventors: Per Egedal, Herning (DK); Jesper Munch, Vejle (DK)

(73) Assignee: Siemens Aktiengesellschaft, München (DE)

( * ) Notice: Subject to any disclaimer, the term of this patent is extended or adjusted under 35 U.S.C. 154(b) by 746 days.

(21) Appl. No.: 12/795,861

(22) Filed: Jun. 8, 2010

(65) Prior Publication Data

US 2010/0319336 A1 Dec. 23, 2010

(30) Foreign Application Priority Data

Jun. 22, 2009 (EP) ..................................... 09008159

(51) Int. Cl.
*F16D 37/00* (2006.01)
(52) U.S. Cl.
USPC .................... 60/327; 60/328; 60/329; 60/418
(58) Field of Classification Search
USPC ........... 60/328, 329, 335, 418, 535, 592, 534; 91/1; 92/5 R
See application file for complete search history.

(56) References Cited

U.S. PATENT DOCUMENTS

| 4,503,673 A * | 3/1985 | Schachle et al. ................. 60/398 |
| 5,461,903 A * | 10/1995 | Harms .............................. 73/40 |
| 7,042,110 B2 * | 5/2006 | Mikhail et al. .................. 290/44 |
| 7,418,820 B2 * | 9/2008 | Harvey et al. ................... 60/487 |
| 2006/0188371 A1 * | 8/2006 | Christensen et al. ......... 416/147 |

FOREIGN PATENT DOCUMENTS

WO WO 2007/071239 A1 6/2007

* cited by examiner

*Primary Examiner* — Edward Look
*Assistant Examiner* — Logan Kraft

(57) ABSTRACT

In one aspect, a hydraulic system including a reservoir, a hydraulic device, a first sensor, a second sensor and a controller is described. The reservoir is connected to the hydraulic device for supplying hydraulic fluid to and from the hydraulic device. The first sensor is adapted for measuring a first volume of the hydraulic fluid in the reservoir. The second sensor is connected to the hydraulic device such that at least one parameter being indicative for a second volume of the hydraulic fluid in the hydraulic device is measurable. The controller is adapted for calculating the second volume of the hydraulic fluid based on the at least one parameter. The controller is adapted for determining a leakage of hydraulic fluid in the hydraulic system based on the first volume and the second volume.

20 Claims, 2 Drawing Sheets

LEAKAGE DETECTION SYSTEM IN A WIND TURBINE

CROSS REFERENCE TO RELATED APPLICATIONS

This application claims priority of European Patent Office application No. 09008159.7 EP filed Jun. 22, 2009, which is incorporated by reference herein in its entirety.

FIELD OF INVENTION

The present invention relates to a hydraulic system and a wind turbine. Moreover, the invention relates to a method for determining a leakage of a hydraulic fluid in a hydraulic system.

ART BACKGROUND

Today, systems in wind turbines for controlling and operating the wind turbine are based on hydraulic systems. In particular, a pitch servo system and a brake system of a wind turbine may be based on hydraulic systems and components.

In the nacelle of the wind turbine a hydraulic fluid tank or a reservoir and a pump station is installed for supplying the hydraulic fluid to the hydraulic devices. The hydraulic fluid, e.g. hydraulic oil, is pumped to the installation locations of the hydraulic systems and hydraulic components. In particular, the hydraulic fluid may be pumped outside of the nacelle of the wind turbine, such as to the outer placed pitch servo system in a hub of the wind turbine. The hydraulic device may provide accumulator banks, proportional valves and hydraulic actuators, for instance.

Today, in conventional wind turbines comprising hydraulic systems, the fluid level may be measured in the oil tank by a digital oil level sensor. If a leakage turns up in the hydraulic system, in particular at outside located hydraulic devices with a large distance from to the oil tank, a high amount of oil may leak out from the hydraulic device before the oil level sensor may measure the leakage based on recirculation of the hydraulic fluid. Thus, a leakage alarm may be given lately. In the time period between the beginning of the leakage and the alarm initiation a high amount of oil may be already leaked.

SUMMARY OF THE INVENTION

It may be an object of the present invention to enable a proper leakage control of a hydraulic system.

In order to achieve the object defined above, a hydraulic system, a wind turbine and a method of determining a leakage of hydraulic fluid in a hydraulic system according to the independent claims are provided.

According to a first exemplary embodiment of the present invention, a hydraulic system is provided. The hydraulic system comprises a reservoir, a hydraulic device, a first sensor, a second sensor and a controller. The reservoir is connected to the hydraulic device for supplying hydraulic fluid to (and from) the hydraulic device. The first sensor is adapted for measuring a first volume of the hydraulic fluid in the reservoir. The second sensor is connected to the hydraulic device in such a way that at least one parameter being indicative for a second volume of the hydraulic fluid in the hydraulic device is measurable. The controller is adapted for calculating the second volume of the hydraulic fluid based on the at least one parameter. Moreover, the controller is adapted for determining a leakage of hydraulic fluid in the hydraulic system based on the first volume and the second volume.

According to a further exemplary embodiment, a wind turbine is provided that comprises the hydraulic system as described above and a nacelle. The reservoir is mounted to the nacelle. The hydraulic system is adapted for controlling an operational state of the wind turbine.

According to a further exemplary embodiment, a method of determining a leakage of hydraulic fluids in a hydraulic system is provided. According to the method, a first volume of the hydraulic fluid in a reservoir that is connected to a hydraulic device of the hydraulic system for supplying the hydraulic fluid to (and from) the hydraulic device is measured. Moreover, at least one parameter indicative for a second volume of the hydraulic fluid in the hydraulic device may be measured. The second volume of the hydraulic fluid is calculated on the basis on the at least one parameter. A leakage of the hydraulic fluid in the hydraulic system is determined based on the first volume and the second volume.

The reservoir may denote a fluid tank that may be adapted for storing hydraulic fluid that may be supplied to the hydraulic device. A fluid pump may be interposed between the reservoir and the hydraulic device for pumping a fluid in any direction. Moreover, the reservoir may be installed in a central position of the hydraulic system. Hence, the reservoir may be installed to a central position of a wind turbine, such as the nacelle. By installing the reservoir to a central position, one reservoir may supply hydraulic fluid to a plurality of hydraulic devices. Thereby only one central supplying reservoir for the hydraulic fluid may be necessary.

The hydraulic fluid may be a fluid that is suitable for operating a hydraulic system. The hydraulic fluid may comprise synthetic or organic hydraulic oil or other suitable hydraulic fluids.

The first sensor adapted for measuring a first volume of the hydraulic fluid in the reservoir may comprise a filling-level metre or a level indicator that may be adapted for physically measuring the volume of hydraulic fluid in the reservoir. Thereby, the first sensor may measure the height of the level of hydraulic fluid (oil level) in the reservoir.

The second sensor is adapted for measuring at least one parameter that is indicative for a second volume of the hydraulic fluid that is present and/or in circulation in the hydraulic device. Parameters that are indicative for a second volume of a hydraulic fluid may be for instance the temperature, the pressure, the piston position of a hydraulic cylinder or the height of a tank or pre-tank of the hydraulic device. Other measurable parameters indicative of the second volume of the hydraulic fluid are possible as well. Therefore, the second sensor may comprise a thermometer, a manometer, a level indicator and/or a position sensor, e.g. of a hydraulic cylinder.

The controller adapted for calculating the second volume may comprise a processing unit, such as a central processing unit installed in a computer machine. The controller is adapted for calculating on the basis of the measured at least one parameter the second volume of the hydraulic fluid.

The second volume defines the amount of hydraulic fluid that is in circulation in the hydraulic device and that is therefore not present in the reservoir and may not easily physically measurable by a level sensor.

The controller may determine a leakage of hydraulic fluids in the hydraulic system based on the measured first volume and the calculated second volume. For instance, the controller may add the first volume and the second volume and may therefore compare the result with a reference value.

Even when installing the reservoir inside the nacelle and the hydraulic system to any other locations in the wind turbine, e.g. outside of the nacelle, the hydraulic system may provide a leakage control as well. In particular, only the reservoir may be installed inside the nacelle wherein the hydraulic device may be placed inside the nacelle or outside the nacelle as well.

With the described hydraulic system of the present invention a continuous measurement of the at least one parameter of the hydraulic device may be enabled. The second sensor may measure parameters, such as the hydraulic fluid pressure and temperature, additionally to a continuous measurement of the hydraulic fluid level in the reservoir measured by the first sensor. The controller receives the input of the first sensor indicating the first volume of the hydraulic fluid in the reservoir. Moreover, the controller receives the input of the measured parameters in the hydraulic device. The controller receives the information of certain operating parameters, such as the temperature of nitrogen gas in the accumulators and/or the hydraulic fluid in the hydraulic device, the pressure of the hydraulic fluid in the hydraulic device and/or the hydraulic fluid level or the position of a piston position in a hydraulic cylinder. Based on these parameters, the controller may permanently and continuously calculate the second volume, i.e. the amount of hydraulic fluid, that is in circulation in the hydraulic device and is thus not longer measurable in the reservoir. In particular, the controller may calculate if the physically measured first volume of the hydraulic fluid in the reservoir is correctly under consideration of the measured parameters indicating the second volume. In other words, the controller may calculate based on the parameters a second volume of the circulating fluid and determines for this reason the first volume of hydraulic fluid that should be in the reservoir during regular operation of the hydraulic system. If the first volume is lower than the controller has calculated, an indication of an oil leakage may be given. The parameters may be measured continuously, so that a leakage may be detected immediately.

A second volume may be calculated on the basis of e.g. a position of a piston so that a nominal value of the first volume may be determined. If the measured first volume is lower than expected first volume, a leakage is determined. In conventional systems, only the fluid level in the reservoir may be detected and a leakage may be principally determined after a certain time period, because an alarm may not be given until the hydraulic fluid level may fall below a certain predetermined fluid level in the reservoir. The predetermined minimum fluid level in the reservoir has to be defined in conventional systems very low, so that also in a regular operating status, when the hydraulic device consumes e.g. a high volume of hydraulic fluid, no false alarm is given due to the low level of fluid in the reservoir. Thus, in conventional systems, a large amount of hydraulic fluid may leak out of the hydraulic system before the conventional leakage preventing system gives alarm.

Moreover, the inventive hydraulic system is permanently aware of the second volume due to the continuously measured parameters. Hence, an alarm may be given when the first volume in the reservoir does not match to a predetermined first volume that is based on the calculated second volume of the hydraulic fluid determined by the measured parameters.

According to a further exemplary embodiment of the hydraulic system, the controller is adapted for comparing the measured first volume with a predetermined reference value of the first volume. The reference value of the first volume is a function of the at least one parameter. By the present exemplary embodiment, a predetermined reference value may be given to the controller. The predetermined reference value may be indicative of the measured parameters in the hydraulic device. In particular, if the temperature in the hydraulic system is high, the hydraulic fluid in the hydraulic device expands and thus a lower amount of the second volume of the hydraulic fluid circulates in the hydraulic device. That is, that the amount of the first volume of the hydraulic fluid in a regular operating hydraulic system should be higher due to the higher temperature in the hydraulic device, so that a lower amount of second volume of hydraulic fluid is needed in the hydraulic device so that the second volume is lower. In other words, the predetermined reference value of the first volume for a regular operating hydraulic system may be taken for instance from a table in which for each working conditions and for each measured parameters a certain reference value e.g. of the first volume may be predetermined. Thus, the predetermined reference value may be exactly adapted to certain operating status of the hydraulic devices, so that the control range of the level of the first volume in the reservoir for a regularly operating system may be kept very small. In comparison to the conventional hydraulic leakage detecting systems, a predetermined reference value gives the lowest possible level of the first volume in a regularly operating system in order to prevent false alarm. Thus, a more exact control system may be provided.

According to a further exemplary embodiment of the hydraulic system, the controller is adapted for giving alarm when the measured first volume differs from the reference value of the first volume by a predefined difference value. In order to reduce false alarms more efficiently, a certain predefined range of the difference value may be predetermined. In particular, the predefined difference value may be indicative of a fluid level of the first volume for a regularly working hydraulic system. When the hydraulic fluid level in the reservoir falls below or above the predefined difference value, this could be indicative for an incorrect working system and thus alarm may be given.

According to a further exemplary embodiment of the hydraulic system, the controller is adapted for calculating the predetermined reference value on the basis of a system status of the hydraulic device. The system status may comprise information about all installed (hydraulic) components, the diameters and the length of the hydraulic lines, the waste, the lifetime and the age of the installed components or other circumstances that could influence the consumption of hydraulic fluid in the hydraulic device. For instance, an accumulator or an intermediate tank for the hydraulic fluid located in the hydraulic device may be pre-pressurized by a nitrogen pre-pressure. Thus, due to the amount and the pressure of the nitrogen a certain second volume of the hydraulic fluid may be stored in the intermediate tank. Thus, if the controller measures the amount and the pressure of the nitrogen, a certain amount of second volume of hydraulic fluid is consumed by the hydraulic device in a regular working state. Thus, the predetermined reference value may be adopted and recalculated on the basis of the system status. Moreover, it is known that over a lifetime of a component waste occurs and thus more hydraulic fluid may be used. This could be also an indicator for the system status that may cause the controller to recalculate a predetermined reference value. Moreover, the controller may be aware of the component version installed in the hydraulic device. In particular, if a larger or smaller hydraulic cylinder may be installed, the part number may be inputted to the controller, so that the predetermined reference value may be automatically adapted to the new consumption of the newly installed hydraulic cylinder by the controller. Thus, a very flexible and self-acting hydraulic leakage system may be provided. Complex and time-consuming modulations of the hydraulic system may be prevented.

According to a further exemplary embodiment of the hydraulic system, the hydraulic device comprises an intermediate tank (accumulator). Therefore, the parameter may be the hydraulic fluid pressure and/or the pressure of a nitrogen in the intermediate tank.

According to a further exemplary embodiment, the hydraulic device comprises a hydraulic cylinder with a piston. The parameter may be a hydraulic fluid pressure, a hydraulic fluid temperature and/or a piston position of the piston in the hydraulic cylinder. Other parameters are possible as well, such as part numbers, lifetime, lifetime of components and/or the length and the diameter of the hydraulic lines.

According to a further exemplary embodiment of the hydraulic system, the hydraulic system comprises a plurality of hydraulic devices. Each of the plurality of hydraulic devices may be connected to the (same) reservoir. The hydraulic system may provide therefore for instance also a plurality of second sensors, wherein each second sensor is connected to each of the plurality of hydraulic devices for measuring parameters indicative for the second volume. Thereby, the hydraulic system is not restricted to only one hydraulic device connected to the reservoir. With the exemplary embodiment of the hydraulic system a complex hydraulic system with a plurality of consumer devices, e.g. hydraulic devices, may be provided. Separate and additional systems for leakage detection may not be necessary. A fast leakage detection may be provided because e.g. the predetermined difference value may be chosen very small without causing false errors. In conventional systems for each additional hydraulic device that would be connected to the reservoir, the minimum, hydraulic fluid level in the reservoir has to be reduced, so that no false alarm is generated. When leakage occurs, the leaked hydraulic fluid is very high and raises proportional to the amount of hydraulic devices that are attached to one reservoir.

According to a further exemplary embodiment of the wind turbine, the wind turbine further comprises a hub with a pitch servo system, wherein the hydraulic system is coupled to the pitch servo system. Thus, the hydraulic device of the hydraulic system may be connected to the pitch servo system for controlling the operating operational state of the wind turbine. In particular for the pitch servo system, a leakage detection system according to the present invention is useful because the hydraulic device may be installed outside of the nacelle and thereby the leaked hydraulic fluid would cause e.g. pollution of the environment.

According to a further exemplary embodiment, the wind turbine further comprises a brake system for braking the rotation of the wind turbine plates. The hydraulic system is coupled to the brake system. As mentioned above, the hydraulic device may be connected to the brake system and thus controlling an operational state of the wind turbine.

With the present invention described above, a continuously measurement of the parameters such as the oil pressure, the oil temperature, the piston position in a hydraulic cylinder and the oil level in the reservoir is provided. From these inputs the controller may calculate the correct oil level in the reservoir that is indicative for a regularly operating hydraulic system. If the calculated value differs too much from the measured value of e.g. the first volume, an alarm may be given. Because of the large variations in the parameters typically for each turbine, the system may calculate its own correct predetermined reference value and its own correct parameters for a regularly operating system. This may be automatically done by the controller based on the measured parameter and the reference value.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
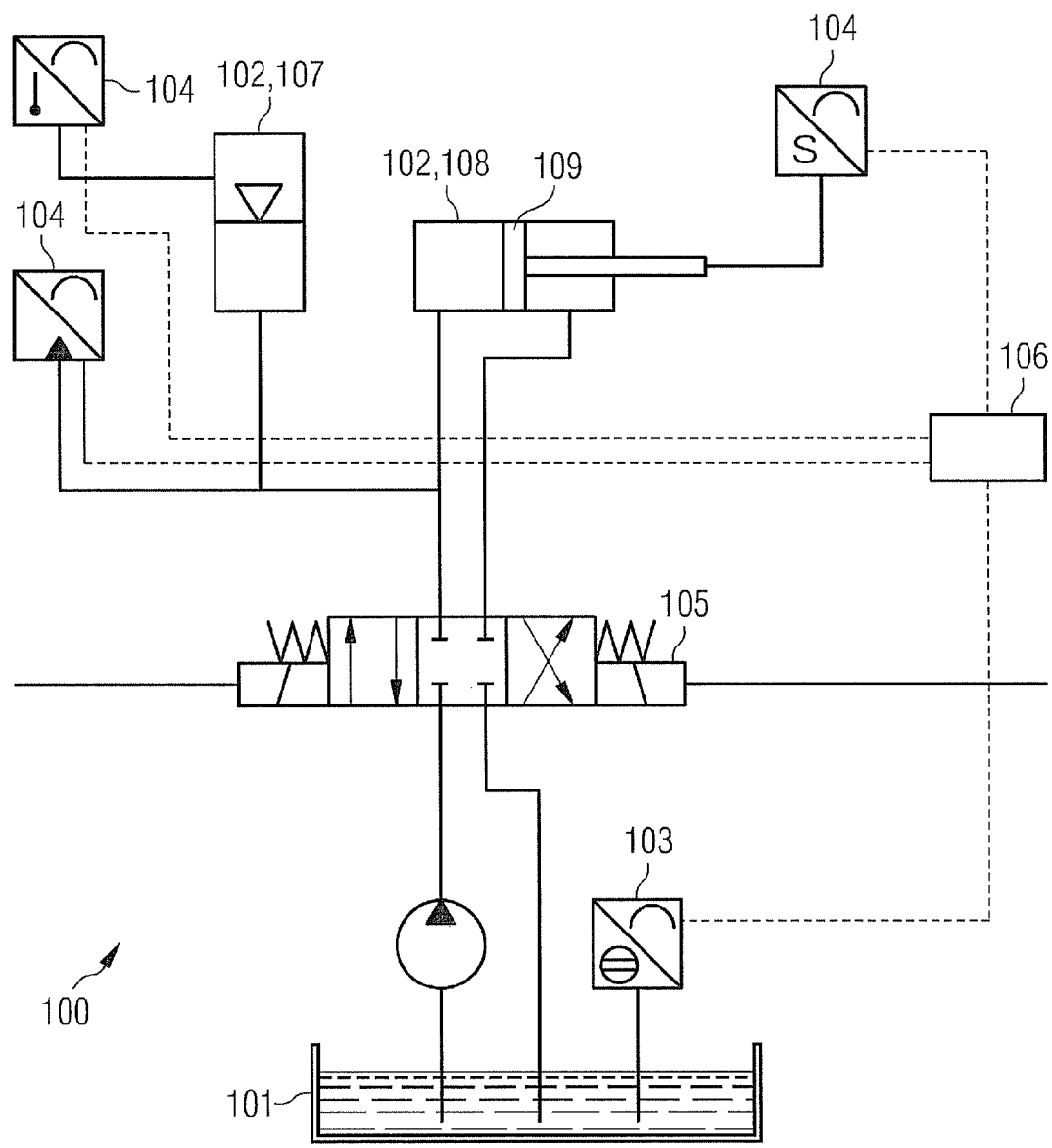
FIG. 1 illustrates a schematical view of a hydraulic system according to an exemplary embodiment of the present invention.

The illustrations in the drawings are schematically. It is noted that in different figures, similar or identical elements are provided with the same reference signs.

FIG. 1 illustrates a hydraulic system 100. The hydraulic system 100 comprises a reservoir 101, a hydraulic device 102, a first sensor 103, a second sensor 104 and a controller 106. The reservoir 101 is connected to the hydraulic device 102 for supplying hydraulic fluid to and/or from the hydraulic device 102. The first sensor 103 is adapted for measuring a first volume V1 of the hydraulic fluid in the reservoir 101. The second sensor 104 is connected to the hydraulic device 102 in such a way that at least one parameter being indicative for a second volume V2 of the hydraulic fluid in the hydraulic device 102 is measurable. The controller 106 is adapted for calculating the second volume V2 of the hydraulic fluid based on the at least one parameter. Moreover, the controller 106 is adapted for determining a leakage of hydraulic fluid in the hydraulic system 100 based on the first volume V1 and the second volume V2.

The reservoir 101 may be located and installed to the nacelle of a wind turbine. To the reservoir 101 the first sensor 103 may be connected for measuring the first volume V1 of the hydraulic fluid in the reservoir 101. From the reservoir 101 hydraulic lines may connect the hydraulic devices 102.

In the exemplary embodiment of FIG. 1, a first hydraulic device 102 may be an intermediate tank 107 that may comprise a certain second volume V2 of the hydraulic fluid. To the intermediate tank 107 the second sensor 104 may be attached. The second sensor 104 measures for instance the temperature T or the pressure p of the hydraulic fluid in the intermediate tank 107. The temperature T and/or the pressure p may be one of the parameters that is indicative for the second volume V2. The measured parameters (temperature T, pressure p) may be further processed in the controller 106 that is connected to the second sensors 104.

Moreover, FIG. 1 illustrates a further hydraulic device 102 that comprises e.g. a hydraulic cylinder 108. To the hydraulic cylinder 108 a piston 109 is attached. A further second sensor 104 may be connected to the hydraulic cylinder 108 for measuring a parameter that is indicative for the second volume V2. The parameter may be for instance the position of the piston 109 in the hydraulic cylinder 108. Depending on the position s of the piston 109 in the hydraulic cylinder 108 a predefined amount of hydraulic fluid may be in the hydraulic cylinder 108. Thus, the parameter of the position s of the piston 109 may be indicative for the second volume V2 of the hydraulic fluid. Besides the measurement of the position s of the piston 109, further second sensors 104 may be installed as well, for instance for measuring the parameters temperature T or pressure p.

The controller 106 may be connected to the second sensor 104 of the hydraulic cylinder 108, so that the controller 106 may calculate the second volume V2. The controller 106 may then determine a leakage of hydraulic fluid in the hydraulic system 100 based on the first volume V1 and the second volume V2.

Moreover, the reservoir 101 may be installed into a nacelle of the wind turbine. The hydraulic devices 102 may be located outside of the nacelle. In particular, the nacelle may provide a directional valve 105 that acts as an interface to the outside of the nacelle and a plurality of hydraulic devices 102 may be attached to the interface. By the interface a plurality of hydraulic devices 102 may be connected to one and the same reservoir, so that for a complex hydraulic system 100 a leakage detection according to the present invention may be provided.

Figure 2:
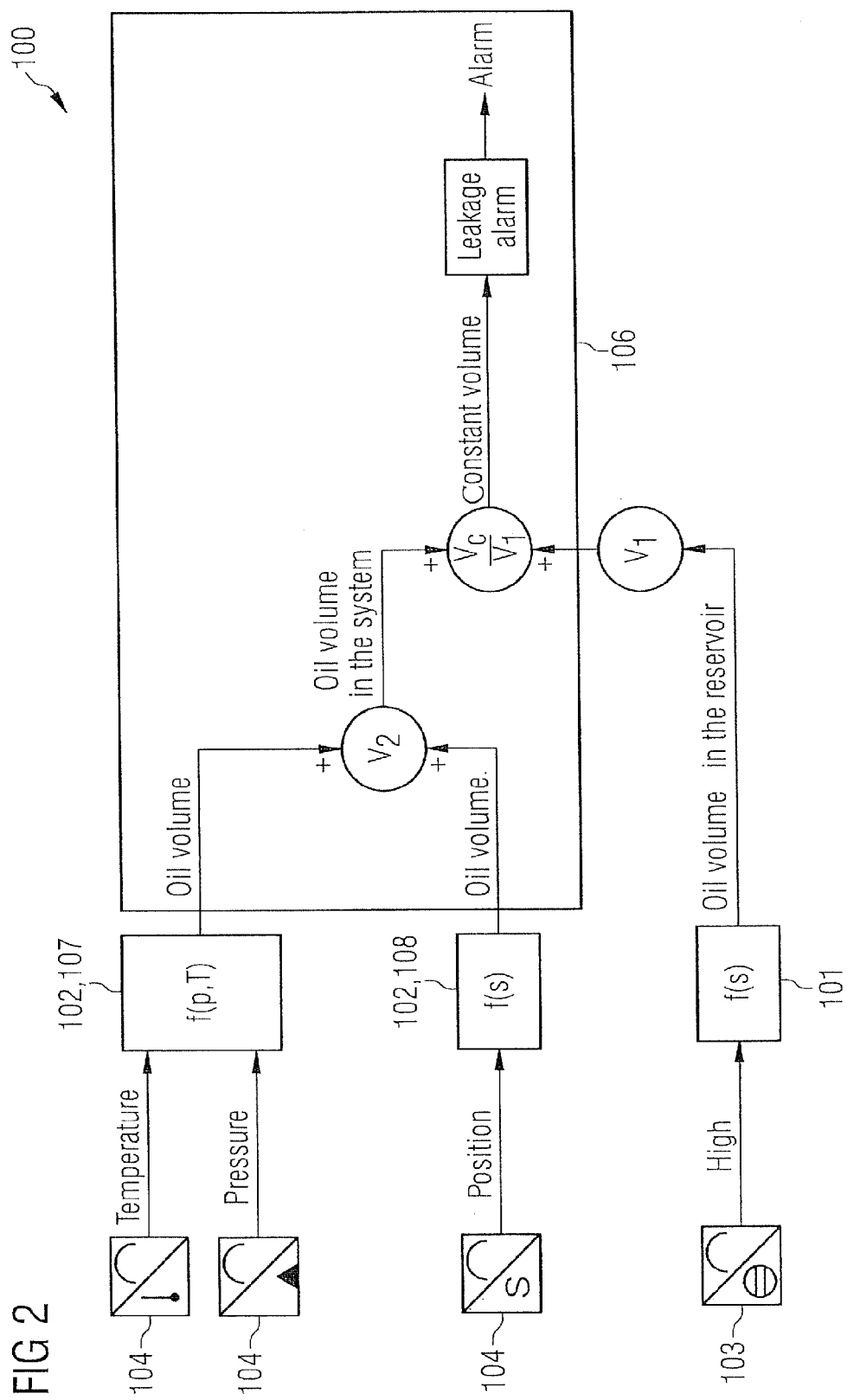
FIG. 2 illustrates a schematical view of a workflow according to an exemplary embodiment of the present invention.

FIG. 2 illustrates a working procedure of the leakage determination system of the hydraulic system 100 according to an exemplary embodiment of the present invention. The parameters, in particular the temperature T and the pressure p of e.g. the intermediate tank and/or the position s of the piston 109 in the hydraulic cylinder 108, may be measured continuously by the second sensors 104.

The controller 106 may calculate the sum of the second volumes V2 of the hydraulic devices 102, 107, 108 on the basis of the continuously measured parameters. Next, the controller 106 may add all partial volumes, so that the second volume V2 may be calculated which is indicative of the total amount of the fluid circulating in the hydraulic devices 102.

Furthermore, the first volume V1, in particular the hydraulic fuel level in the reservoir 101, may be measured by the first sensor 103 that is for instance a fluid level sensor that measures the height of fluid level in the reservoir 101. On the basis of the measured first volume V1 and the measured second volume V2 a leakage of the hydraulic system 100 may be determined.

One option for determining the leakage may be the determination of both volumes, the first volume V1 and the second volume V2, wherein the sum of both volumes V1, V2 should be constant. If the sum of the first volume V1 and the second volume V2 varies, this could be an indicator for a leakage of hydraulic fluids in the hydraulic system 100.

Besides that it is furthermore possible to define a predetermined reference value of the first volume V1 that is a function of the at least one parameter for the second volume V2. Thus, when the predefined reference value differs by a predefined difference value, an indication for leakage may be given.

The predetermined reference value may also be calculated by the controller 106 on the basis of system status information of the hydraulic devices 102, so that automatically an appropriate and adopted predetermined reference value is generated. Thus, the quality of the hydraulic system 100 for measuring a leakage may be improved.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A hydraulic system, the hydraulic system, comprising:
    a hydraulically operated device which is supplied a hydraulic fluid that when is pressurized actuates the hydraulically operated device;
    a reservoir connected to the hydraulically operated device for supplying the hydraulic fluid to and from the hydraulically operated device;
    a first sensor measures a first volume of the hydraulic fluid in the reservoir;
    a second sensor, which is connected to the hydraulically operated device, measures a parameter of the hydraulically operated device which is indicative for a second volume of the hydraulic fluid; and
    a controller calculates the second volume of the hydraulic fluid based on the parameter and determines a leakage of hydraulic fluid in the hydraulic system based on the first volume and the second volume,
    wherein the controller compares the measured first volume with a predetermined reference value of the first volume, and
    wherein the reference value of the first volume is a function of the parameter.

2. The hydraulic system of claim 1, wherein the controller generates an alarm when the measured first volume differs from the reference value of the first volume by a predefined difference value.

3. The hydraulic system of claim 1, wherein the controller calculates the predetermined reference value on the basis of a system status of the hydraulically operated device.

4. The hydraulic system of claim 1,
    wherein the hydraulically operated device comprises an intermediate tank, and
    wherein the parameter includes a hydraulic fluid pressure or hydraulic fluid temperature in the intermediate tank.

5. The hydraulic system of claim 1,
    wherein the hydraulically operated device comprises an intermediate tank, and
    wherein the parameter includes a hydraulic fluid pressure and hydraulic fluid temperature in the intermediate tank.

6. The hydraulic system of claim 1,
    wherein hydraulically operated device comprises a hydraulic cylinder with a piston;
    wherein the parameter is at least one of the group consisting of a hydraulic fluid pressure, a hydraulic fluid temperature and a piston position of the piston in the hydraulic cylinder.

7. The hydraulic system of claim 1, further comprising:
    a plurality of hydraulically operated devices.

8. A wind turbine, comprising:
    the hydraulic system according to claim 1; and
    a nacelle,
    wherein the reservoir is mounted to the nacelle,
    wherein the hydraulic system controls an operational state of the wind turbine.

9. The wind turbine of claim 8, further comprising:
    a hub with a pitch servo system,
    wherein the hydraulic system is coupled to the pitch servo system.

10. The wind turbine of claim 8, further comprising:
a brake system for braking the rotation of wind turbine blades,
wherein the hydraulic system is coupled to the brake system.

11. The wind turbine of claim 10, wherein the controller generates an alarm when the measured first volume differs from the reference value of the first volume by a predefined difference value.

12. The wind turbine of claim 8, wherein the controller calculates the predetermined reference value on the basis of a system status of the hydraulically operated device.

13. The wind turbine of claim 8,
wherein the hydraulically operated device comprises an intermediate tank, and
wherein the parameter includes a hydraulic fluid pressure or hydraulic fluid temperature in the intermediate tank.

14. The wind turbine of claim 8,
wherein the hydraulically operated device comprises an intermediate tank, and
wherein the parameter includes a hydraulic fluid pressure and hydraulic fluid temperature in the intermediate tank.

15. The wind turbine of claim 8,
wherein hydraulically operated device comprises a hydraulic cylinder with a piston;
wherein the parameter is at least one of the group consisting of a hydraulic fluid pressure, a hydraulic fluid temperature and a piston position of the piston in the hydraulic cylinder.

16. A method of determining a leakage of hydraulic fluid in a hydraulic system, the method comprising:
providing a hydraulically operated device which is supplied the hydraulic fluid that when is pressurized actuates the hydraulically operated device;
measuring a first volume of the hydraulic fluid in a reservoir, which is connected to the hydraulically operated device of the hydraulic system for supplying the hydraulic fluid to and from the hydraulically operated device;
measuring at least one parameter of the hydraulically operated device which is indicative for a second volume of the hydraulic fluid in the hydraulically operated device, the measuring is by a sensor connected to the hydraulically operated device;
calculating the second volume of the hydraulic fluid based on the at least one parameter;
comparing the measured first volume with a predetermined reference value of the first volume by a controller; and
determining a leakage of the hydraulic fluid in the hydraulic system based on the comparison,
wherein the reference value of the first volume is a function of the parameter.

17. The hydraulic system of claim 1,
wherein the parameter is selected from at least one of hydraulic fluid pressure, hydraulic fluid temperature and a piston position of a piston in the hydraulically operated device.

18. The hydraulic system of claim 1,
wherein the reservoir and the hydraulically operated device are fluidly connected and separated by a directional valve.

19. The hydraulic system of claim 1,
wherein the hydraulically operated device comprises a hydraulic cylinder with a piston.

20. The method of claim 16,
wherein the hydraulically operated device comprises a hydraulic cylinder with a piston.

* * * * *